2,601,331

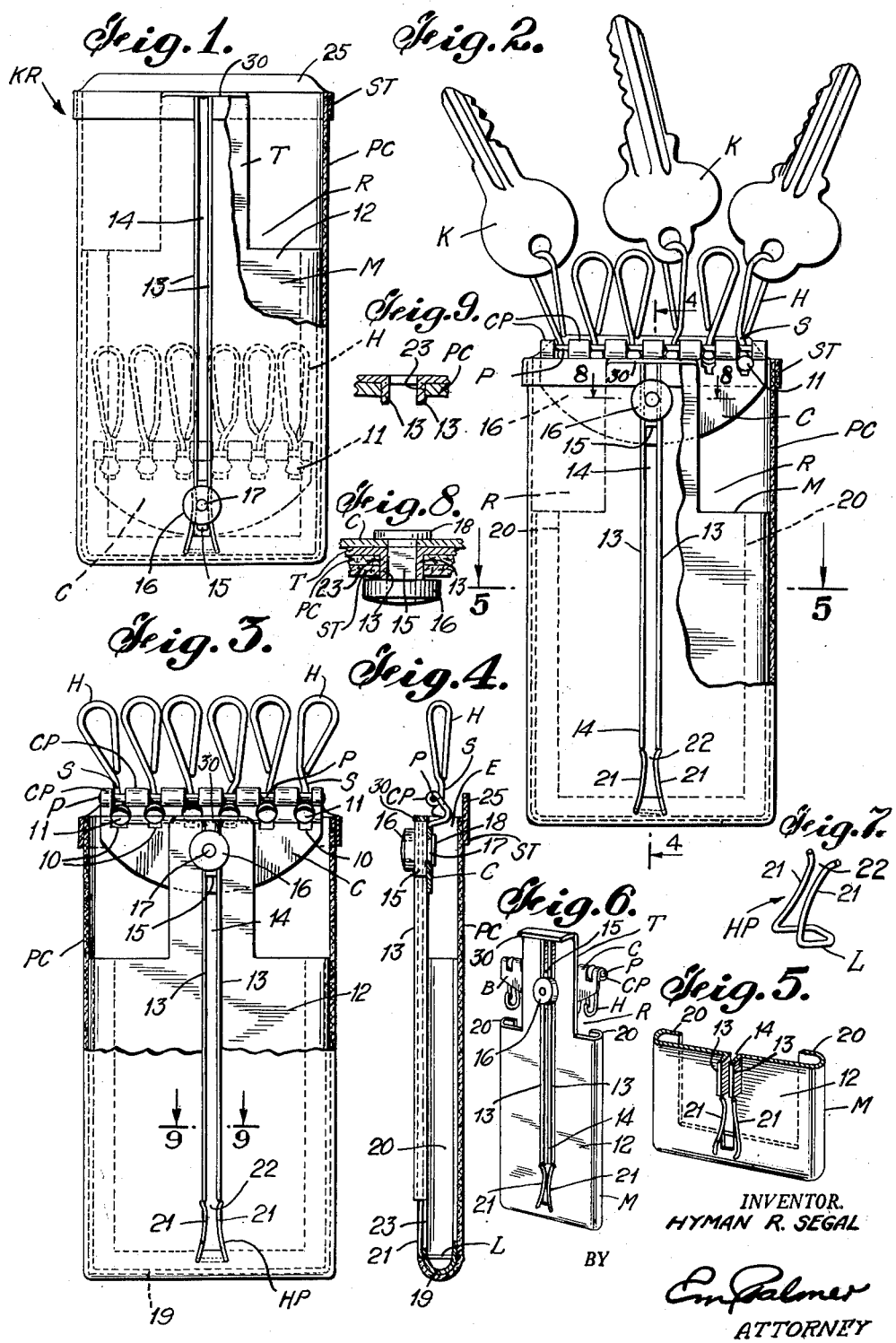
June 24, 1952 — H. R. SEGAL — 2,601,331
KEY RETAINER
Filed Aug. 26, 1949
INVENTOR.
HYMAN R. SEGAL
ATTORNEY Patented June 24, 1952

UNITED STATES PATENT OFFICE 2,601,331

KEY RETAINER

Hyman R. Segal, New York, N. Y.

Application August 26, 1949, Serial No. 112,562

5 Claims. (Cl. 150—40)

This invention is a key retainer and the primary object thereof is realized in the provision of a novel and improved carriage adapted to support a plurality of keys flatwise in an effective but flexible pouch and adapted to be conveniently shifted towards the mouth of the pouch upon actuation of a readily accessible manipulator linearly guided on a concealed casing or mount adequately reinforcing the flexible pouch. Another object is concerned with spaced resilient links of an offset loop for cooperating with intervening means bodily movable with the manipulator and carriage to hold the latter in a retracted position within the pouch. Another object deals with spaced flanges extending from the mount and beyond spaced sides of a relatively elongated slot in one wall pouch for reinforcing the spaced edges of this slot and to prevent wear thereof on displacement of the manipulator. Other important functional and structural features of the invention will appear from the following detailed description taken with the accompanying drawings wherein:

Fig. 1 is a front elevational view of the key retainer showing the carriage fully retracted within the pouch shown partly broken away.

Fig. 2 is a view similar to Fig. 1 illustrating the carriage shifted towards the mouth or gap of the pouch to project the keys attached to swingable hooks out of the pouch.

Fig. 3 is a view along the lines of Fig. 2 but with a major part of the slotted wall of the pouch partly broken away to illustrate the slidable carriage partly withdrawn from the pouch to expose the swingable hooks.

Fig. 4 is a sectional view on the line 4—4 of Fig. 2.

Fig. 5 is a fragmentary perspective view of the mount on the line 5—5 of Fig. 2, however shown in perspective.

Fig. 6 is a perspective view of the slidable carriage guide or mount.

Fig. 7 is a perspective view of the hair pin spring.

Fig. 8 is a sectional view on the line 8—8 of Fig. 2, and

Fig. 9 is a sectional view on the line 9—9 of Fig. 3.

The key retainer broadly designated KR is characterized by the hollow casing or mount M slidably guiding the carriage C having a retained fulcrum pin P secured by the spaced coiled portions CP extending forwardly of the rectilinear body or plate B of the carriage. Plate B is provided with slots 10 to permit swinging of shanks S of hooks H which include the enlarged heads 11 to prevent their falling through slots 10 while pin P prevents shanks S from being detached from the carriage.

Mount M is in the form of a hollow casing having the supporting wall 12 including outwardly extending spaced flanges 13 defining an elongated guide slot 14 in which the rectangular lug 15 extending from manipulator or button 16 projects. Pin 17 passing through lug 15 and carriage C is force fitted into manipulator 16. Pin 17 has an upset head 18 closely bearing against the carriage. By this arrangement, pin 17 serves as a connector between the manipulator and carriage. Therefore if the manipulator be displaced, the carriage is correspondingly shifted relative to the mount M which includes the bottom wall 19 and the inwardly curved sides 20 defining hollow members or sockets under which the carriage C may be slid whereby lug 15 may be shifted between the outwardly concaved and inwardly convexed tines or limbs 21 of the wire hair pin spring HP having its loop L bent substantially at right angles to limbs 21 and effectively anchored to the curved bottom end wall. The resilient limbs 21 define the tapered mouth 22 for readily receiving lug 15 to permit limbs 21 to resiliently grasp and hold lug 15 in set position and thereby maintain the carriage in a fully retracted position within the mount whereby keys K may be held fully concealed and in flatwise relation within the leather pouch of mount M. Pouch PC also includes opening or slot 23 (Fig. 8) having outside edges disposed below flanges 13 while limbs 21 of the hair pin spring are at the bottom part of slot 14 and in alignment with flange or tracks 13 on which button 16 rides. Flanges 13 therefore prevent wear of contiguous portions of the pouch on shifting of the manipulator or button 16.

Mount M reinforces pouch PC and is provided with the reduced portion or tongue T defining recesses as R to permit upper portions of the normally distended pouch PC to be slightly collapsed by the fingers of the operator to preclude the key retainer from slipping from the operator's hand. The upper part of the pouch has secured thereto also for reinforcing purposes the leather strap ST having the outwardly extending flat or lip 25 extending beyond the mouth or ejecting gap E of the pouch through which hooks H may be projected upon actuation of manipulator 16 and into which the keys may be received and fully retracted into the pouch upon shifting of the manipulator in an opposite direction.

Further to prevent wear of the pouch, tongue T is provided with an outwardly bent lip or flange 30 projecting slightly beyond the outer face of the pouch at the ejecting gap E.

Various changes may be made in details of construction and arrangement of parts without departing from the spirit of the invention or sacrificing any of the advantages thereof inherent therein.

I claim:

1. In a key retainer, a carriage having means swingably sustaining hooks for holding keys, a mount supporting said carriage and having a guide slot, spaced flanges at spaced sides of said slot and extending from said mount, a manipulator outside of said carriage above said slot and flanges, means bodily movable with and interconnecting said manipulator and carriage and slidably guided in said slot, sockets integral with and at the sides of said mount for slidably receiving said carriage, and a pouch closely surrounding and secured to said mount and in part below said flanges and having at one end thereof a gap to permit projection or retraction of said keys out of or into said pouch on actuation of said manipulator.

2. In a key retainer, a carriage having means swingably sustaining hooks for holding keys, a mount supporting said carriage and having a guide slot, a manipulator outside of said carriage above said slot and having a lug guided therein, means securing said lug fixedly relative to said carriage, sockets integral with and at the sides of said mount for slidably receiving said carriage, a pouch closely surrounding and secured to said mount and having at one end thereof a gap to permit projection or retraction of said keys out of or into said pouch on actuation of said manipulator, spring means secured to said mount and having arcuate limbs at one end of said slot for cooperating with said lug to hold said carriage fully retracted within said pouch, said mount reinforcing said pouch and including a reduced portion to provide for manually and partially collapsing said pouch to facilitate gripping of the latter, and said mount having spaced flanges at spaced sides of said guide slot projecting beyond contiguous portions of said pouch to prevent wear of the latter as said manipulator is displaced relative to said mount.

3. In a key retainer, a carriage having means swingably sustaining hooks for holding keys, a mount having a wall including a longitudinally arranged guide slot, a manipulator outside of said carriage above said slot and having a lug slidably guided therein, means securing said lug fixedly relative to said carriage, spaced inwardly turned members spaced from said wall and integral with and at the sides of said mount and defining with said wall means between which said carriage is slidably received, a flexible pouch closely surrounding and secured to said mount and having at one end thereof a gap to permit projection or retraction of said keys out of or into said mount on actuation of said manipulator, spring means secured to said mount and having spaced limbs at one end of said slot for resiliently cooperating with said lug to hold said carriage fully retracted within said pouch, said mount reenforcing said pouch and said wall including a reduced portion to provide for manually and partially collapsing said pouch to facilitate gripping the latter, and said mount having spaced flanges at spaced sides of said guide slot to hold said manipulator away from said pouch.

4. The retainer according to claim 3 wherein said reduced portion embodies an outwardly bent lip at the entrance of said gap.

5. The retainer according to claim 4 wherein said pouch embodies a reenforcing strap secured at the upper marginal portion thereof and having a forwardly projecting flap.

HYMAN R. SEGAL.

REFERENCES CITED

The following references are of record in the file of this patent:

UNITED STATES PATENTS

| Number | Name | Date |
| --- | --- | --- |
| 1,762,770 | Droutman | June 10, 1930 |